US 6,725,367 B2

(12) United States Patent
Morrison et al.

(10) Patent No.: US 6,725,367 B2
(45) Date of Patent: Apr. 20, 2004

(54) METHODS AND SYSTEMS FOR CONSTRUCTING AND INTERPRETING HIERARCHICAL CONFIGURATION FILES

(75) Inventors: Conor P. Morrison, Seattle, WA (US); Sivaprasad V. Padisetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 09/772,037

(22) Filed: Jan. 29, 2001

(65) Prior Publication Data

US 2002/0103994 A1 Aug. 1, 2002

(51) Int. Cl.$^7$ .............................. G06F 9/445
(52) U.S. Cl. ........................................ 713/1
(58) Field of Search ................ 713/1, 2, 100; 709/220–222

(56) References Cited

U.S. PATENT DOCUMENTS

| | | |
|---|---|---|
| 4,888,771 A | 12/1989 | Benignus et al. |
| 5,414,812 A | 5/1995 | Filip et al. |
| 5,499,333 A | 3/1996 | Doudnikoff et al. |
| 5,758,154 A | 5/1998 | Qureshi |
| 5,838,918 A | 11/1998 | Prager et al. |
| 5,943,497 A | 8/1999 | Bohrer et al. |
| 6,052,720 A | 4/2000 | Traversat et al. |
| 6,085,034 A | 7/2000 | Danforth |
| 6,105,066 A | 8/2000 | Hayes, Jr. |
| 6,237,092 B1 | 5/2001 | Hayes, Jr. |
| 6,334,178 B1 | 12/2001 | Cannon et al. |

*Primary Examiner*—Thomas M. Heckler
(74) *Attorney, Agent, or Firm*—Leydig, Voit & Mayer, Ltd.

(57) ABSTRACT

A configuration system is disclosed that applies rules of precedence to evaluate parameters in the context of multiple sections within a configuration file and in the context of multiple configuration files. The system brings together multiple sections and multiple files into a unified whole. The precedential order of sections and files is set by a user and special section names can be used to override default precedential rules. If a parameter is set multiple times at different levels in the hierarchy of belonging, its final value reflects the value set at the level most closely concerned with the setting of the parameter. The value of a parameter can be set from an environmental variable or from the value of another parameter. If a parameter's value depends upon the value of another parameter, that second parameter is recursively evaluated using the same precedential rules.

32 Claims, 11 Drawing Sheets

Configuration File 300

```
[GLOBAL]
    p = value 1
    q = value 2

[FIRST CLUSTER]
    p = value 3
    q = value 4

[SECOND CLUSTER]
    p = value 5
    q = value 6

[MACHINE 104]
    q = value 7

[MACHINE 114]
    q = value 8
```

FIG. 3A

Configuration File 302

```
[GLOBAL]
    q = value 9

[CLUSTER]
    q = value 10
    r = value 11

[MACHINE]
    q = %r%
```

FIG. 3B

Configuration File 304

```
[GLOBAL]
    Options = -Server:%TestServer%
    Time = 12

[TESTER]
    Time = 6

[DEVELOPMENT]
    Options = %Options% -check

[TESTSUITE-DEFAULT]

[ONE-TEST]
    LogFile = [.].log
    Command = onetest.exe %Options%  -Time:%Time% -log:%LogFile%
```

FIG. 3C

Configuration File 306

```
[FIRST SECTION]
    p = value 12

[SECOND SECTION]
    p = value 13

[THIRD SECTION]
    p = value 14

[OVERRIDE] (always highest precedence)
    q = value 15

[DEFAULT] (always lowest precedence)
    r = value 17
```

FIG. 3D

```
[GLOBAL]
    Directories = System
    Key = ClusterValue

[GROUP-Cluster]
    Directories = Cluster

[BuildNumber]
    Cluster = 1
    Global = 1
    System = 1
```

FIG. 7

METHODS AND SYSTEMS FOR CONSTRUCTING AND INTERPRETING HIERARCHICAL CONFIGURATION FILES

TECHNICAL FIELD

The present invention relates generally to computer operating systems and applications, and, more particularly, to configuring parameters.

BACKGROUND OF THE INVENTION

Many aspects of a computer's behavior can be configured by setting parameters in an initialization file that the computer executes during start up. Similarly, an application's configuration parameters can be set in an initialization file executed when that application is started. The universe of possible configuration options is expanding dramatically and with it the length and complexity of initialization files. Correctly setting up an initialization file so that the computer or application acts in a desired manner becomes more difficult and time consuming with the increase in the number of configuration options and with the increasing interaction among those options.

Difficult as configuration is for one machine or one application, it is exponentially more difficult to configure multiple computers and multiple applications so that they interact with their environment and with each other in a predictable fashion. With multiple computers, different sets of configurable parameters are set to reflect different levels in each computer's "hierarchy of belonging." That is, some parameters, the most general, are the same for all computers, some may reflect particular choices made by the corporation that owns the computer, some parameters accommodate the particular needs of a department within the corporation, and some parameters are specific to the particular user of the computer. Different system administrators may be responsible for setting the parameters pertaining to different levels in the hierarchy of belonging. Often, the same parameter will be given different values during configuration of different levels of the hierarchy, leading to confusion and unpredictable behavior. It becomes extremely difficult for any one person to correctly initialize all of the parameters in a computer's configuration. Similar considerations apply to configuring applications.

Adding to the difficulty of creating correct configurations, a configuration may change with time. The computer may be moved, changing its place in the hierarchy of belonging. It may be reassigned to a different function. Servers used by an application may change. Computers and applications may be used in an environment, such as a testing environment, in which their configurations may be changed every time they operate.

There is a need to contain the burgeoning complexity of configuration, a way to divide the labor of the entire configuration job into subtasks so that each task may be performed competently, and a way to integrate the work of the various subtasks into a unified whole.

SUMMARY OF THE INVENTION

The above problems and shortcomings, and others, are addressed by the present invention, which can be understood by referring to the specification, drawings, and claims. The present invention is a configuration system that applies rules of precedence to evaluate parameters in the context of multiple sections within a configuration file and in the context of multiple configuration files. The invention brings together the multiple sections and multiple files into a unified whole.

The precedential order of sections and files may be set by a user and special section names used to override default precedential rules. If a parameter is set multiple times at different levels in the hierarchy of belonging, its final value reflects the value set at the level most closely concerned with the setting of the parameter.

To accommodate increased interactions among configuration parameters, the value of a parameter can be set from an environmental variable or from the value of another parameter. If a parameter's value depends upon the value of another parameter, that second parameter is recursively evaluated using the same precedential rules.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3A through 3D are schematic diagrams of configuration files in which parameters are recursively evaluated;

FIG. 7 is a schematic diagram showing the configuration file that results from applying the merge( ) command of FIG. 6A to the configuration files of FIG. 5.

DETAILED DESCRIPTION OF THE INVENTION

Figure 1:
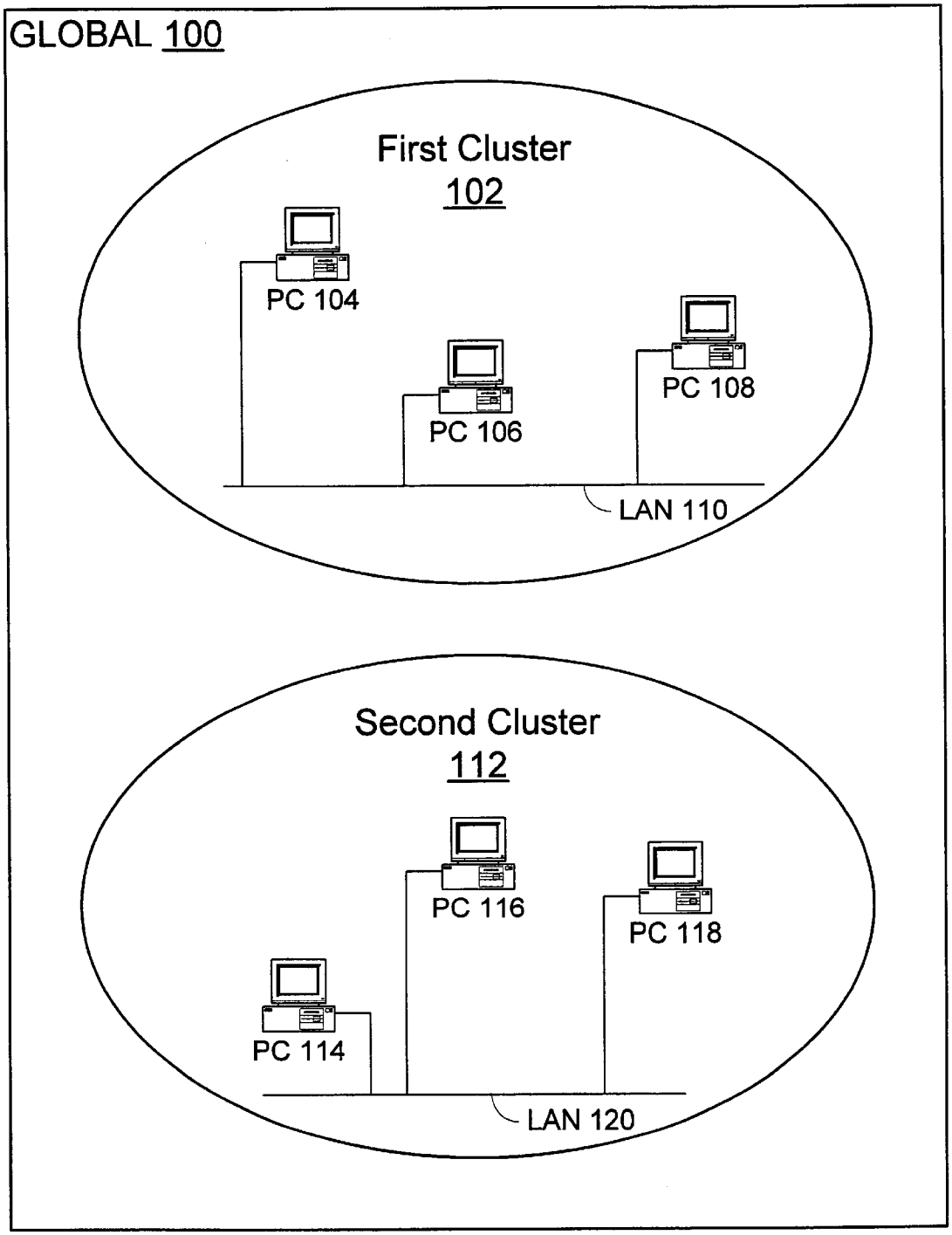
FIG. 1 is a schematic diagram showing levels in an exemplary computer's hierarchy of belonging.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Recursive Evaluation When Setting a Configuration Parameter's Value

Configuration parameters for a computer (or application) are set according to the levels in the computer's (or application's) hierarchy of belonging. As an illustration, FIG. 1 shows three levels in a system of computers' hierarchy of belonging. All of the computers in FIG. 1 share some configuration parameters as a result of their membership in a Global group 100. Computers 104, 106, and 108 share some further configuration parameters due to their common membership in a First Cluster 102. These parameters are potentially different from those of computers 114, 116, and 118 in a Second Cluster 112. Finally, each computer in FIG. 1 has configuration parameters specific to itself. A configuration file setting these parameters is divided into multiple sections with each section associated with a level in the hierarchy of belonging. Different administrators may be responsible for configuration at different levels in the hierarchy, or for particular groups of computers at particular levels. The administrators define in each section parameters of particular importance to the group of computers corresponding to that section. Sometimes the work of different administrators overlaps as the same parameter is defined in more than one section that is applicable to a particular computer. In order to coordinate the effects of these multiple definitions, the present invention, according to one of its aspects, develops and applies rules of precedence. Precedence is enforced so that a multiply defined parameter is given a value from a section with highest precedence, for example, the smallest subset of computer systems with which a particular computer's configurable parameter is associated.

Figure 2:
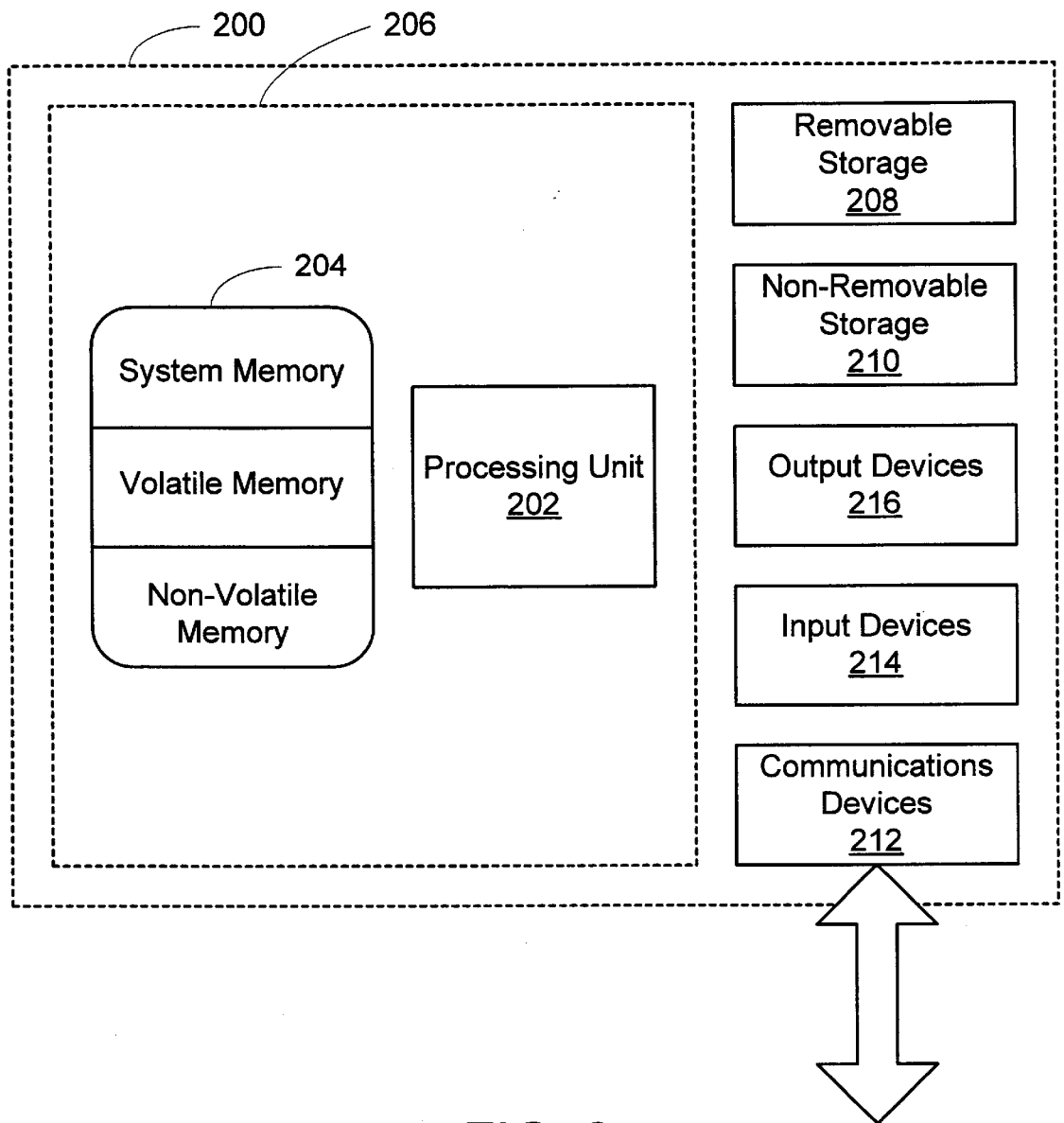
FIG. 2 is a block diagram generally illustrating an exemplary computer system that supports the present invention.

The computers 104, 106, etc., of FIG. 1 may be of any architecture. FIG. 2 is a block diagram generally illustrating an exemplary computer system that supports the present invention. The computing device 200 is only one example of a suitable environment and is not intended to suggest any limitation as to the scope of use or functionality of the invention. Neither should the computing device 200 be interpreted as having any dependency or requirement relating to any one or combination of components illustrated in FIG. 2. The invention is operational with numerous other general-purpose or special-purpose computing environments or configurations. Examples of well-known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, computing device 200 typically includes at least one processing unit 202 and memory 204. The memory 204 may be volatile (such as RAM), non-volatile (such as ROM, flash memory, etc.), or some combination of the two. This most basic configuration is illustrated in FIG. 2 by the dashed line 206. The computing device may have additional features and functionality. For example, computing device 200 may include additional storage (removable and non-removable) including, but not limited to, magnetic and optical disks and tape. Such additional storage is illustrated in FIG. 2 by removable storage 208 and non-removable storage 210. Computer-storage media include volatile and non-volatile, removable and non-removable, media implemented in any method or technology for storage of information such as computer-readable instructions, data structures, program modules, or other data. Memory 204, removable storage 208, and non-removable storage 210 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by device 200. Any such computer storage media may be part of device 200. Device 200 may also contain communications connections 212 that allow the device to communicate with other devices. Communications connections 212 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks (including LANs 110 and 120 of FIG. 1) and direct-wired connections, and wireless media such as acoustic, RF, infrared, and other wireless media. The term computer-readable media as used herein includes both storage media and communications media. The computing device 200 may also have input devices 214 such as a keyboard, mouse, pen, voice-input device, touch-input device, etc. Output devices 216 such as a display, speakers, printer, etc., may also be included. All these devices are well know in the art and need not be discussed at length here.

Figure 4A:
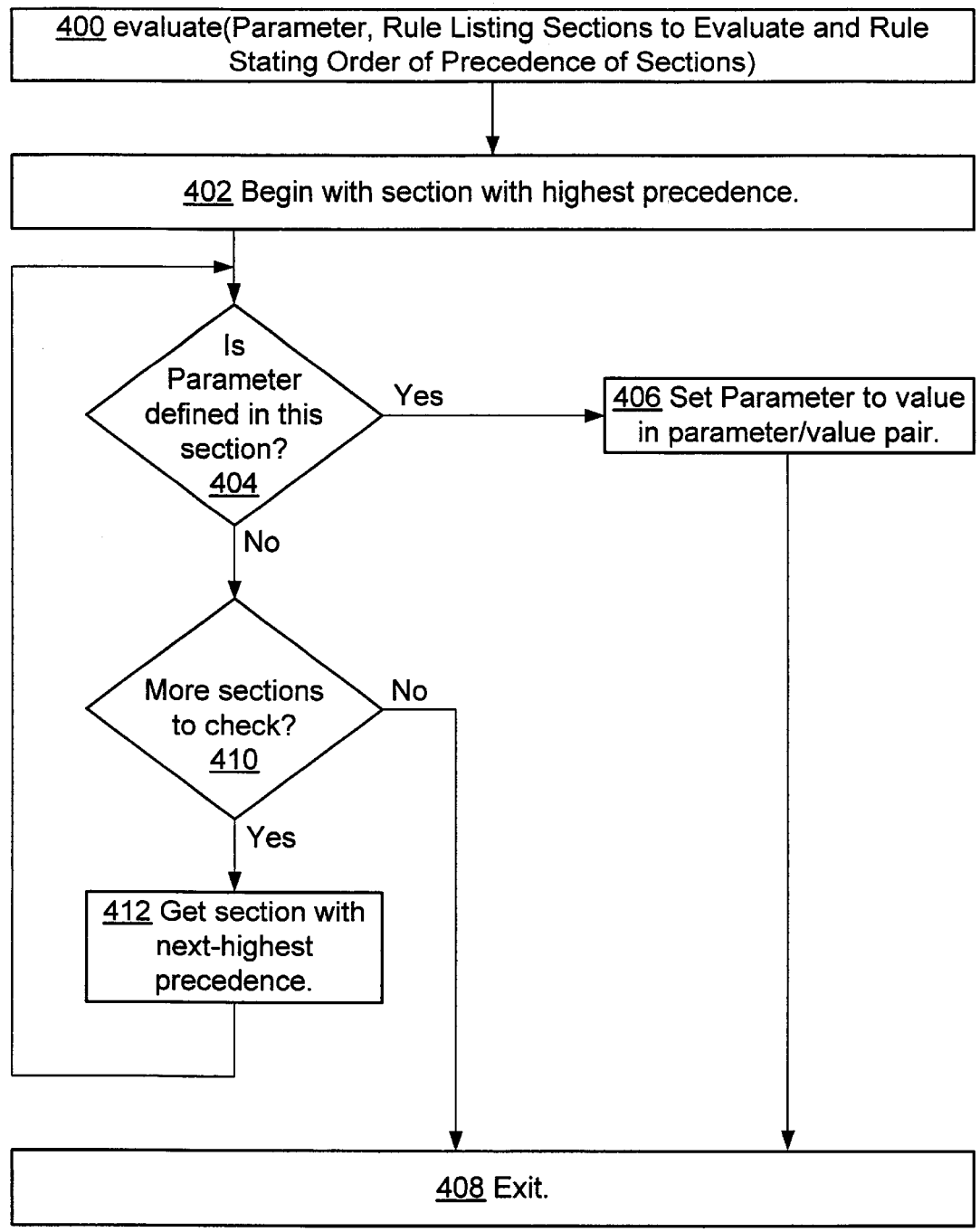
FIG. 4A is a flow chart illustrating one possible process for evaluating a parameter, where the parameter is potentially defined in multiple sections, and where a rule specifies the order of precedence of the sections.

The configuration file 300 of FIG. 3A is divided into sections corresponding to the three levels in the hierarchy of belonging depicted in FIG. 1. There is one GLOBAL section and two CLUSTER sections, one for the First Cluster 102 of FIG. 1 and the other for the Second Cluster 112. For clarity's sake, only two MACHINE sections are shown but there could be a MACHINE section for each PC in FIG. 1. A parameter "p" is defined in three of the sections while another parameter "q" is defined in all five. The values of p and q after the configuration file is evaluated depend upon the order of precedence of the five sections. FIG. 4A is a flow chart illustrating one possible process for evaluating a parameter, where the parameter is potentially defined in multiple sections, and where a rule specifies the order of precedence of the sections. Step 400 defines a command called "evaluate( )" that takes as arguments the name of a parameter to evaluate, a rule stating which sections to evaluate, and a rule specifying the order of precedence among those sections. In FIG. 4A's implementation of evaluate( ), the two rules are merged into one argument that lists the sections to evaluate in order from lowest to highest precedence. Evaluation of the parameter begins in step 402 with the section with the highest precedence as specified by the order of precedence argument to evaluate( ). Step 404 checks to see if the section contains a parameter/value pair that gives a value to the parameter of interest. If it does, then the parameter is set to that value in step 406 and evaluate( ) exits in step 408. Otherwise, steps 410 and 412 direct the examination to the section with the next-highest precedence, if there is one, and the process repeats in step 404. Note for now that precedence is set by the evaluate( ) command, not by the file itself. This point is reexamined below.

A few simple examples using FIG. 3A serve to clarify how evaluate( ) works. The command evaluate(p, "GLOBAL, FIRST CLUSTER, MACHINE 104") results in assigning "value 3" to parameter p. The parameter/value pair "p=value 1" in GLOBAL is overridden by "p=value 3" in FIRST CLUSTER because the evaluate command gives FIRST CLUSTER a higher precedence than it gives GLOBAL. The fact that MACHINE 104 is given a still higher precedence is immaterial because MACHINE 104 does not define a value for p. The command evaluate (q, "GLOBAL, FIRST CLUSTER, MACHINE 104") assigns "value 7" to q, using the same logic as above. Evaluate(q, "GLOBAL, FIRST CLUSTER") assigns "value 4" to q because the parameter/value pair "q=value 7" in MACHINE 104 is not evaluated. Not all sections need to be evaluated every time.

Figure 4B:
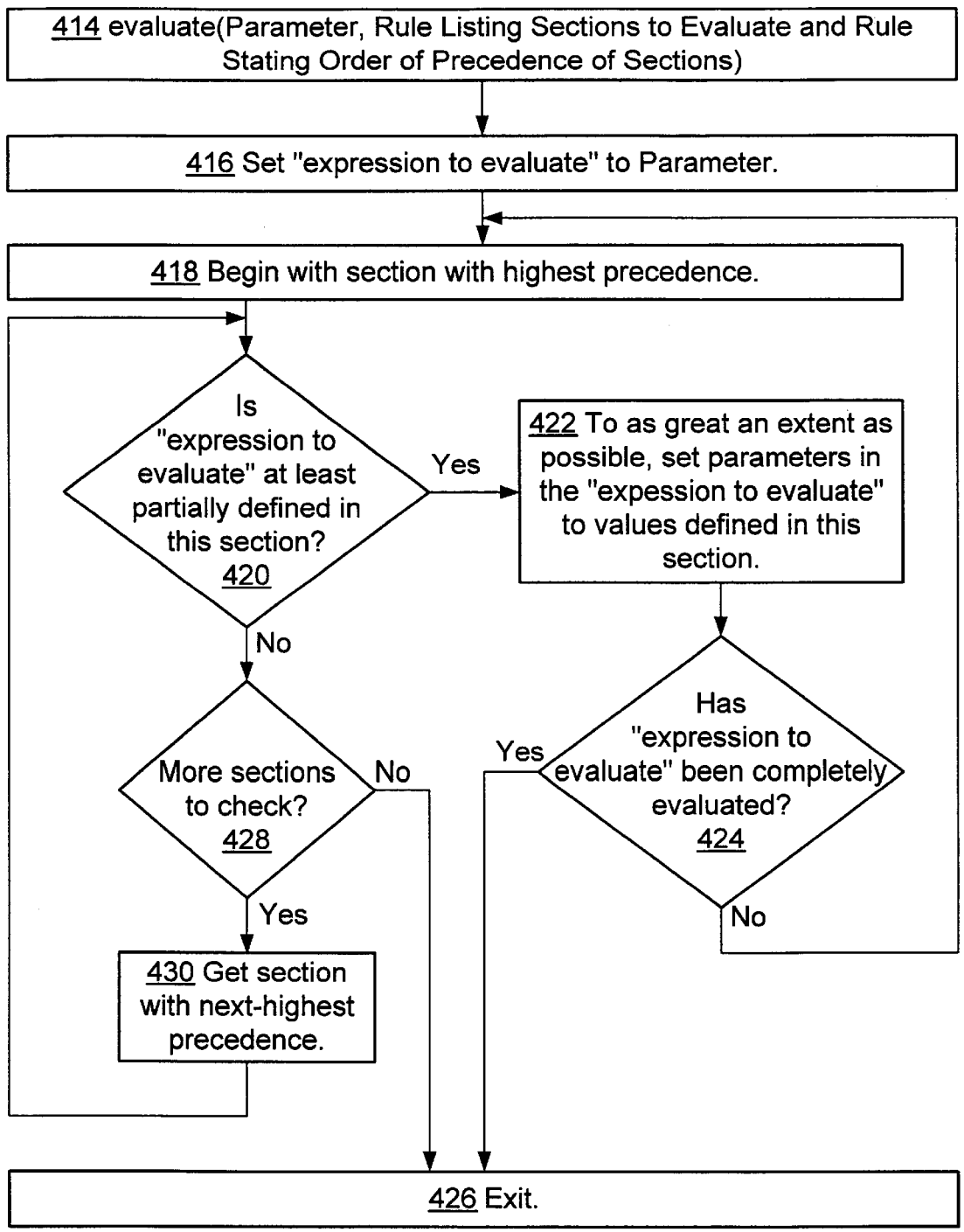
FIG. 4B is a flow chart illustrating one possible enhancement to the process of FIG. 4A, the enhancement allowing for recursive evaluation of a parameter when the value of the parameter depends upon the value of another parameter.

The configuration file 302 of FIG. 3B introduces a more intricate evaluation of parameter q. In the MACHINE section, parameter q is assigned the value "%r%". This means that parameter q is assigned to the value of r, another parameter. When q is given this value, parameter r is evaluated recursively using the same order of precedence given to the evaluate( ) command. FIG. 4B is a flow chart illustrating an enhancement to the process of FIG. 4A that allows for this possibility of recursive evaluation. For example, evaluate(q, "GLOBAL, CLUSTER, MACHINE") first sets "expression to evaluate" to q in step 416. Step 418 begins to evaluate the "expression to evaluate" in the section with the highest precedence, that is, in section MACHINE. Steps 420 and 422 find a value for the "expression to evaluate" in MACHINE and assign the value "%r%" to q. Recursive evaluation is necessary because the value assigned to q in step 422 depends upon the value of another parameter, here, the value of r. The "expression to evaluate" is now "%r%". Because step 424 determines that this expression has not been completely evaluated, depending as it does upon the value of r, processing continues at step 418. Sections are again evaluated in order of precedence. MACHINE does not assign a value to the "expression to evaluate" so steps 428 and 430 direct the processing to the section with the next-highest precedence, CLUSTER. CLUSTER assigns "value 11" to r. This value for r replaces "%r%" as the value assigned to q. Because the "expression to evaluate", which is now "value 11", does not require further evaluation, step 424 directs evaluate( ) to conclude at step 426. In the end, the evaluate( ) command assigns "value 11" to q.

Configuration file 304 of FIG. 3C is more complex than the previous examples but applies the same principles with two further enhancements. First, if a value for a parameter is not found in the configuration file, then the value is taken from an environmental variable, if one exists with the name of the parameter. Second, the value in a parameter/value pair may refer to the name of a section in the configuration file. This is especially useful when a machine is repeatedly configured, as, for example, in a testing environment. The following notation may be used:

[.] The name of the current section, that is, the section containing the parameter/value pair;

[..] The name of the section whose precedence is one step higher than the precedence of the current section;

[..\..] The name of the section whose precedence is two steps higher than the current section; and

[\] The name of the section with the highest precedence. A step-by-step walkthrough of a final example using the configuration file in FIG. 3C ties together the above principles. When processing the command, evaluate(Command, "GLOBAL, TESTER, DEVELOPMENT, TESTSUITE-DEFAULT, ONE-TEST"), the section with the highest precedence, ONE-TEST, is searched for a parameter/value pair containing the parameter Command. Finding one, Command is set to "onetest.exe %Options%-Time:%Time%-log:%LogFile%". Because Command's value contains references to other parameters, the evaluation of Command is not yet complete. The reference parameters are evaluated recursively using the order of precedence defined in the evaluate( ) command. Command refers to the value of the parameter Options. Going down the order of precedence (and toward the top of the file 304 as depicted in FIG. 3C), Option takes the value "%Options%-check" in section DEVELOPMENT. As this value again refers to the value of parameter Options, that parameter is evaluated further up the stack to find that Options is set in the GLOBALS section. Taking the value of Options set in GLOBALS and plugging it into the value of Options set in DEVELOPMENT gives the result that Options is set to "-Server:%TestServer%-check". This in turn leads to a recursive search for a value for the TestServer parameter. Because that parameter is not set in the configuration file, the environment is searched. Assume that an environmental variable TestServer exists and is set to the value "wolfcub". At this point, the processing of evaluate( ) has given a value of "onetest.exe-Server:wolfcub -check-Time:%Time%-log:%LogFile%" to Command. The value of the Time parameter is found in section TESTER giving Command the value "onetest.exe-Server:wolfcub -check-Time:6-log:%LogFile%". Parameter LogFile is evaluated, first in section ONE-TEST which assigns it the value "[.].log". As described above, the "[.]" notation refers to the name of the current section. Thus LogFile is set to the value "ONE-TEST.log" and Command is assigned the final value "onetest.exe-Server:wolfcub-check-Time:6-log:ONE-TEST.log".

For the sake of the examples given above, the order of precedence is declared by the evaluate( ) command. That method is often useful, but other methods are also used. The configuration file 306 in FIG. 3D shows some of the alternatives. A section can be named "OVERRIDE" and that name specifies, first, that this section should always be included when evaluating a parameter and, second, that this section has the highest precedence. In this case, parameter q is set to "value 15" regardless of settings in other sections. In a second method, for a parameter whose name matches that of an environmental variable, the highest precedence can be given to the value of that environmental variable. In this case, if the environmental variable has been given a value, then that value is given to the parameter, and that value cannot be overridden by parameter/value pairs in configuration files. This option may be set in a flag passed to the evaluate( ) command. In a third method, a section DEFAULT can be always evaluated and have precedence lower than that of any other section. In file 306, this means that parameter r is set to "value 17" if no other section gives it a value. The location of sections in a file can set their precedence. For example, later sections may always have higher precedence than earlier sections. In the Figure, THIRD SECTION could always have precedence over FIRST SECTION based on their relative locations. Other methods for setting precedence are certainly possible. The present invention is not limited by how precedence is set, but evaluates parameters given the order of precedence.

Merging Multiple Input Configuration Files

In the preceding section, multiple sections within a configuration file are evaluated according to rules of precedence. Just as a complicated configuration task is divided into multiple sections in a single configuration file, the same task is divided into multiple configuration files. Each file corresponds to one level in the computer's (or application's) hierarchy of belonging and contains parameter/value pairs appropriately set at that level. This section describes how the invention, according to one of its aspects, merges multiple initialization files, using the same concepts of precedence developed above.

Figure 5:
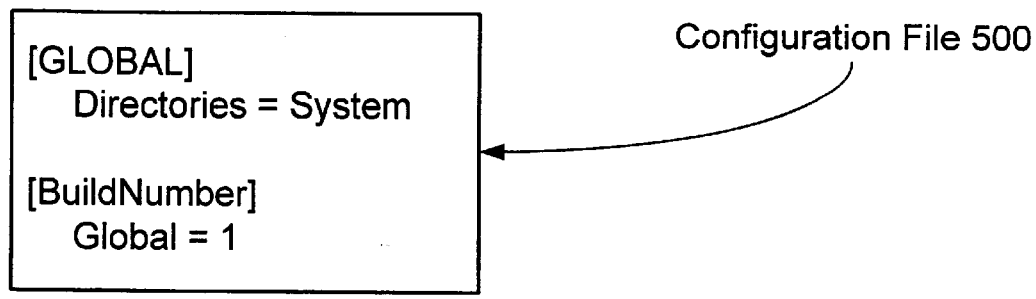
FIG. 5 is a schematic diagram of three configuration files, each corresponding to a level in an exemplary computer's hierarchy of belonging.
Figure 5:
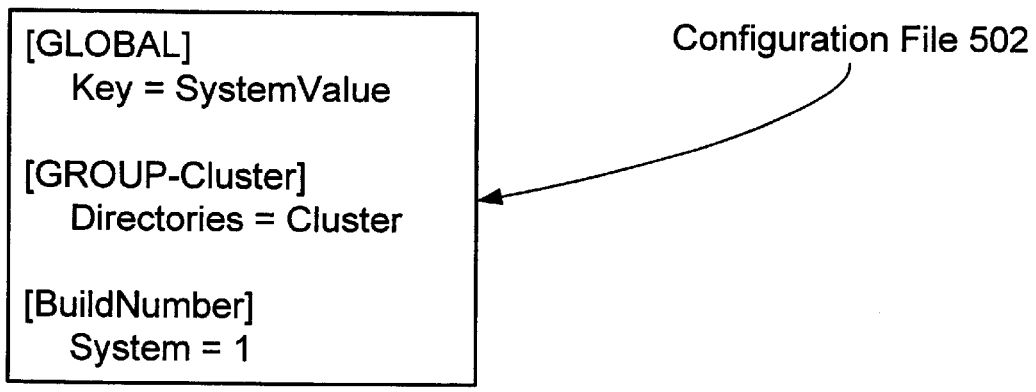
Figure 5:
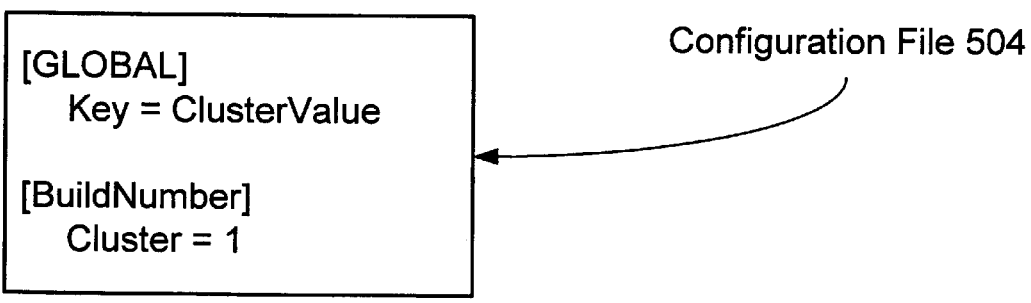

FIG. 5 is a schematic diagram of three configuration files, each corresponding to a level in an exemplary computer's hierarchy of belonging. To illustrate the reason for having three separate configuration files, compare this Figure with FIG. 1. Configuration file 500 sets parameters applicable to all of the computers in FIG. 1's GLOBAL group 100. Configuration file 502 may only apply to computers 104, 106, and 108 in the First Cluster 102, and configuration file 504 may be particular to one test to be run on computer 106. This particular hierarchy is for purposes of illustration. Other hierarchies may be used without affecting the operation of the invention. In any case, computer 106 is completely configured by using information contained in all three configuration files.

Figure 6A:
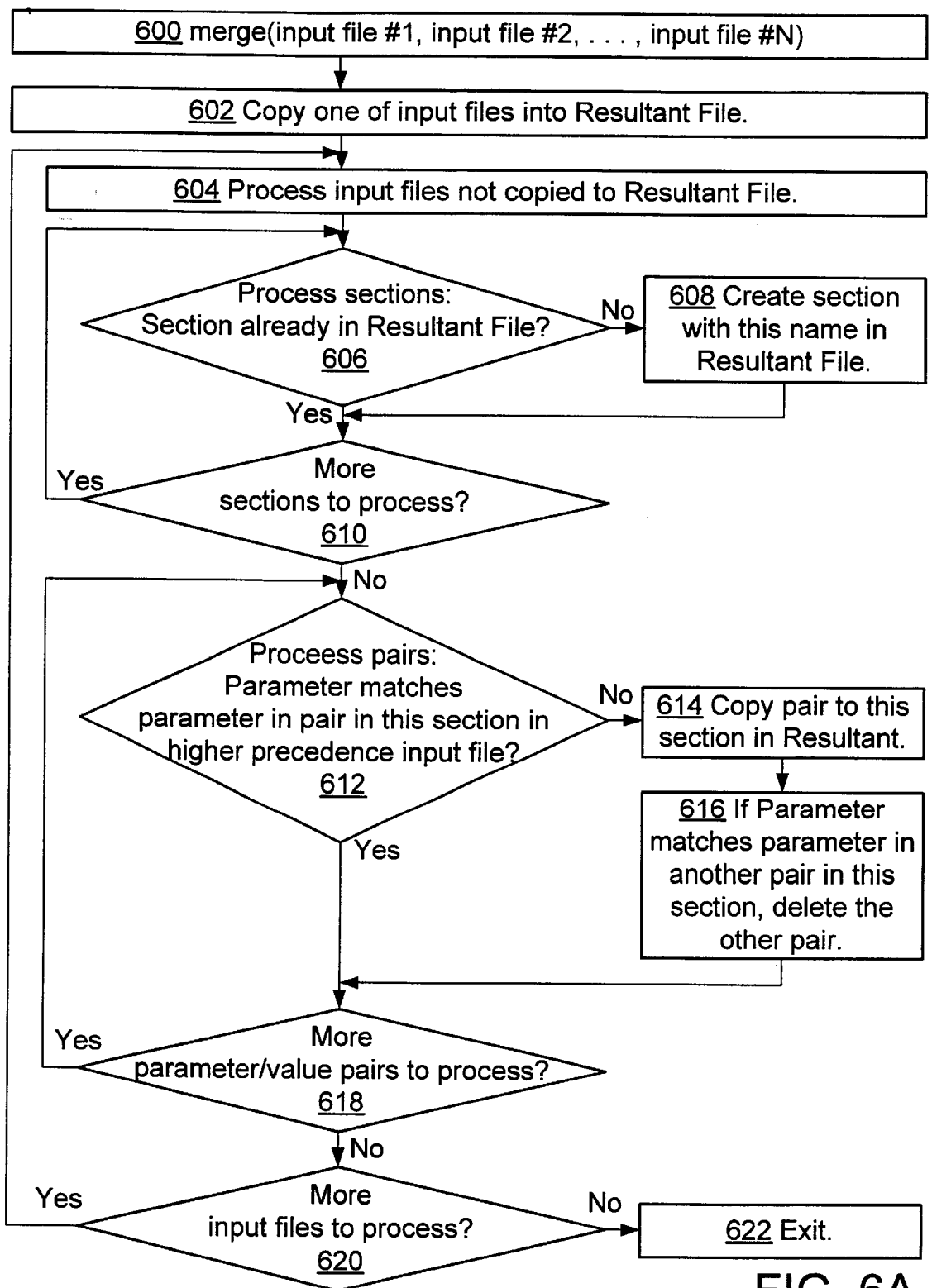
FIGS. 6A through 6C are flow charts illustrating three possible processes for merging configuration files.

The configuration files may overlap in their section names and in the parameter/value pairs within each section. All three configuration files 500, 502, and 504 in FIG. 5 contain a GLOBAL section, and files 502 and 504 each set the parameter Key in section GLOBAL. Rules of precedence determine which settings prevail. FIG. 6A is a flow chart illustrating one possible process for applying rules of precedence to merge the configuration files. The Figure illustrates how a command 600 of the form merge(input file #1, input file #2, . . . , input file #N) can produce a resultant merged file. The arguments to merge( ) are in the order of decreasing file precedence. In practice, that means that if the same parameter is set in parameter/value pairs in a section of the same name in more than one input file, then the parameter/value pair from the highest precedence input file prevails and is written to the resultant file. The corresponding parameter/value pairs from the lower precedence input files do not appear in the resultant file. The process of accomplishing this result begins in FIG. 6A by copying in step 602 one of the input files to the resultant file. Next, each of the other input files is processed in the loop of step 604. An input file is scanned section by section in the loop of box 606. If a section is found whose name is not already present in the resultant file, then step 608 creates a section with that name in the resultant file. Then, step 612 scans the input file parameter/value pair by parameter/value pair. If a parameter/value pair is found whose parameter is not present in a parameter/value pair in a corresponding section in any higher precedence input file, then step 614 copies this parameter/value pair to the resultant file. There is a possibility that the parameter in this parameter/value pair corresponds to a parameter in another parameter/value pair already present in this section of the resultant file. The logic of step 612 ensures that this already-present pair cannot have been put there by step 614 so the pair must have been written when an input file was copied into the resultant file in step 602. The already-present pair must have come from an input file with lower precedence than that of the current input file (again, by the logic of step 612) so the current parameter/value pair takes precedence over the already-present pair and the already-present pair is deleted in step 616.

If the configuration files of FIG. 5 are given greater precedence the lower they appear in that Figure, then they may be merged by calling merge(Configuration File 504, Configuration File 502, Configuration File 500) or by calling the mergeo command twice in succession:

merge(Configuration File 504, Configuration File 502) to produce an Intermediate File; and merge(Intermediate File, Configuration File 500) to produce the Resultant Merged Configuration File.

FIG. 7 is a schematic diagram showing a Resultant Merged Configuration File that results from applying the merge( ) command of FIG. 6A to the configuration files of FIG. 5. The parameter Key in section GLOBAL takes the value ClusterValue because Configuration File 504 takes precedence over Configuration File 502 which set Key to SystemValue. All non-conflicting sections and parameter/value pairs are copied into the resultant file. Note that the parameter Directories is defined both in section GLOBAL and in section GROUP-Cluster. The order of precedence of these two sections may be specified and the parameter evaluated by the methods discussed above.

Figure 6B:
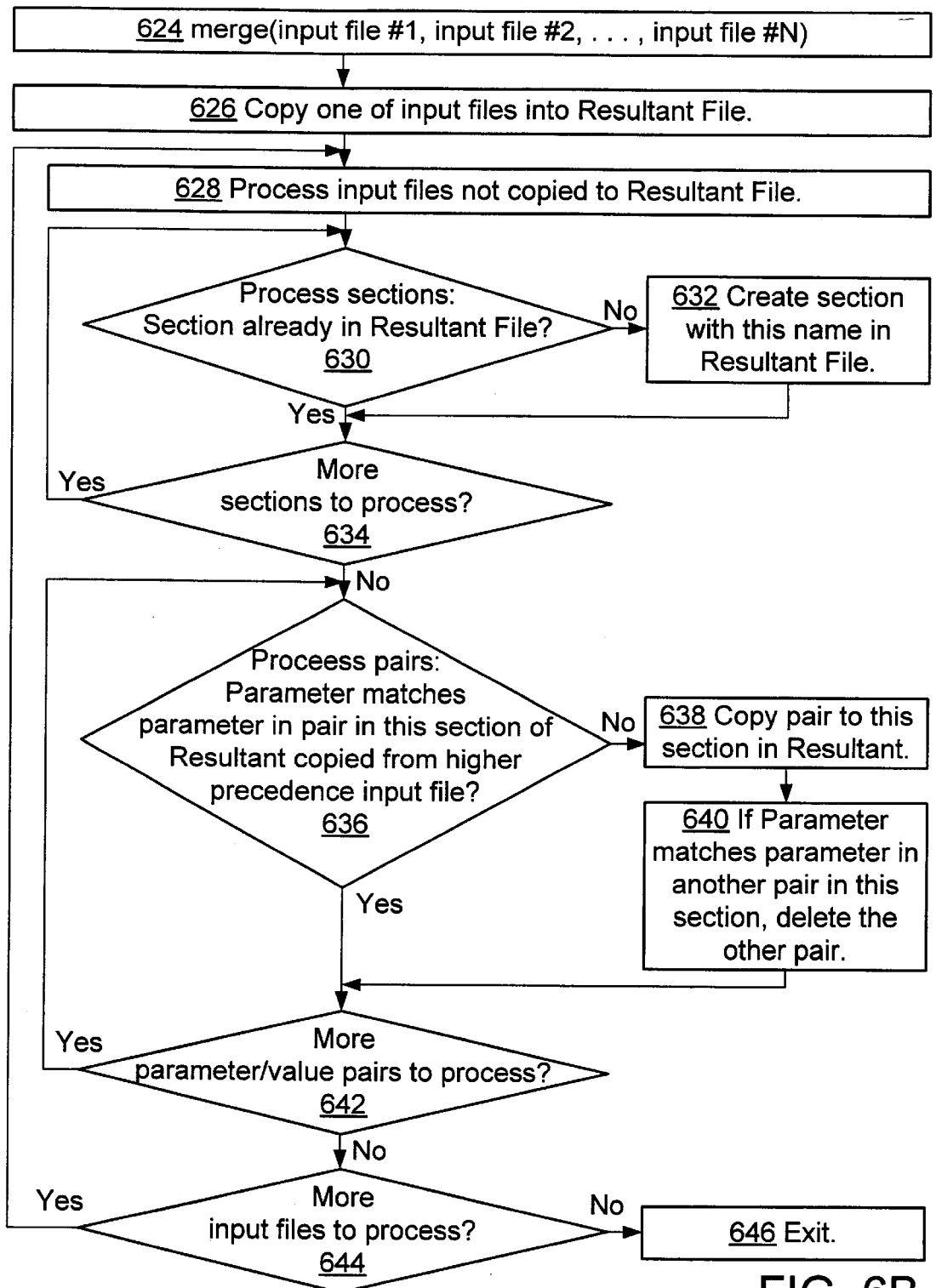
Figure 6C:
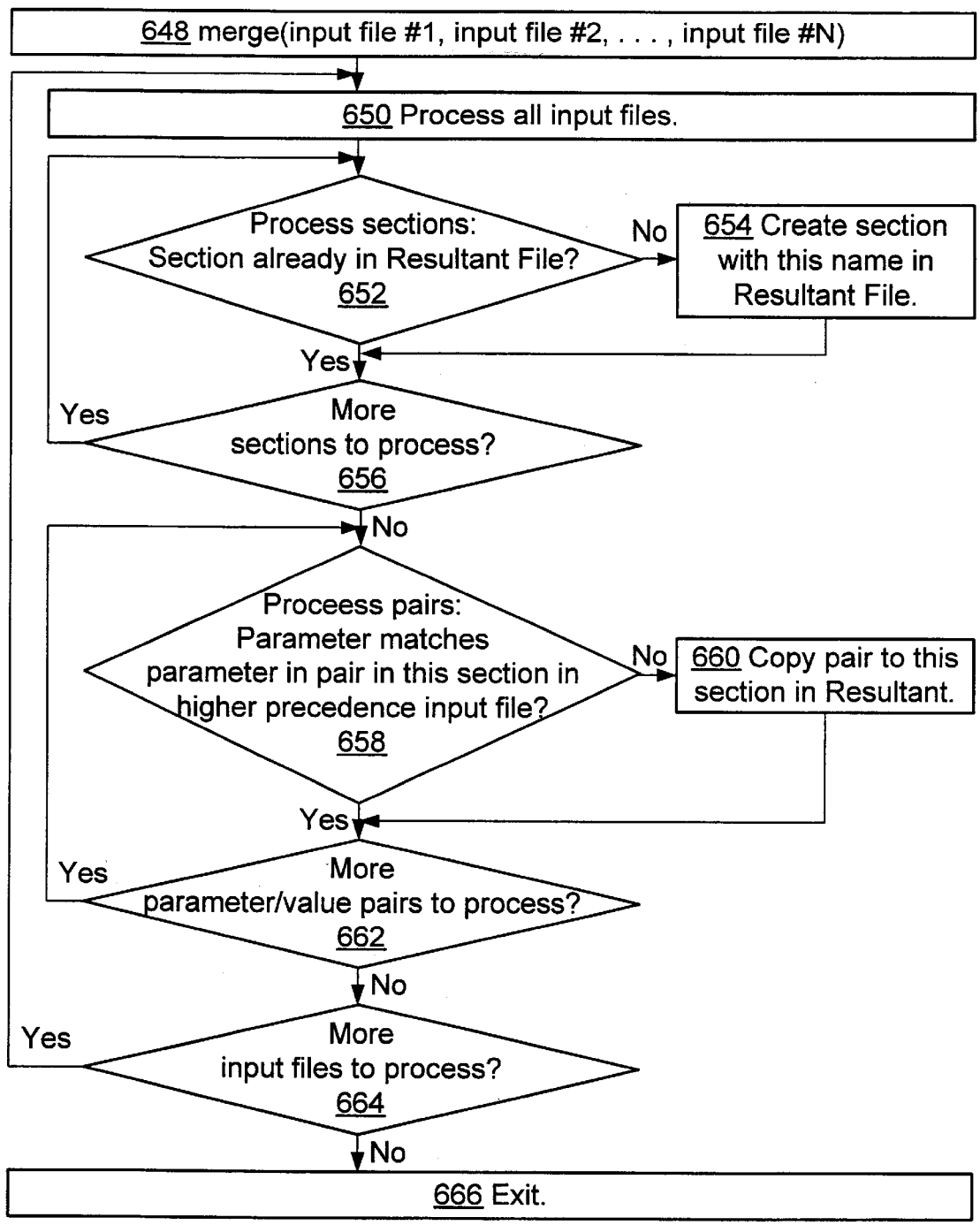

FIG. 6A shows only one of many possible implementations of the merge( ) command. FIG. 6B is another implementation of merge( ) that replaces the logic of FIG. 6A's step 612 with step 636. In FIG. 6B's step 636, a parameter/value pair in an input initialization file is only compared against those pairs already in the resultant file, rather than, as in FIG. 6A's step 612, against pairs in all of the input files. If the parameter/value pair takes precedence over the pairs already present in the corresponding section of the resultant file, then it is copied to that section, overwriting conflicting, lower precedence pairs, if any. FIG. 6C presents yet another implementation of the merge( ) command. This implementation does not begin by copying one input initialization file into the resultant file but processes all of the input initialization files in the same manner. Because of this, when steps 658 and 660 copy parameter/value pairs into the resultant file that do not conflict with pairs from higher precedence input files, there is no need to overwrite pairs already present in the resultant file that came from lower precedence files. The results produced by the three implementations of the merge( ) command in FIGS. 6A through 6C are the same. Performance or other considerations such as memory vs. processing time tradeoffs determine which of these implementations, or which of other implementations not illustrated, is appropriate for the circumstances.

In a variation on these methods, the resultant file is not actually created. It is, instead, created virtually and its effects on configuration are determined and applied when a parameter is evaluated. The may be done, for example, by passing to the evaluate( ) command of the preceding section a hierarchical list of configuration files to evaluate along with the hierarchical list of sections to evaluate. Whether the resultant file exists or is only virtual, the techniques of the preceding section may be applied to evaluate a parameter in the context of the resultant file.

In this example, the order of precedence among files is specified by the order of arguments to the merge( ) command, just as the preceding section specified the rules of precedence by arguments to the evaluate( ) command. Here, as there, other methods of specifying precedence may be more appropriate in some situations. The present invention is not limited by how precedence is set, but rather merges files given the set order of precedence.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A method for setting a first parameter's value based on at least one initialization file, the at least one initialization file containing sections, at least one of the sections containing a parameter/value pair, the method comprising:

selecting sections of the at least one initialization file;

specifying an order of precedence among the selected sections of the at least one initialization file; and setting the first parameter's value to a value in a parameter/value pair in a selected section having the highest specified precedence of those selected sections that contain a parameter/value pair containing the first parameter.

2. The method of claim 1 wherein selecting comprises selecting at least one section of the at least one initialization file based on a name of the at least one section.

3. The method of claim 1 wherein specifying the order of precedence of at least one selected section is based on a name of the at least one selected section.

4. The method of claim 1 wherein specifying the order of precedence of at least one selected section is based on a location in the at least one initialization file of the at least one selected section.

5. The method of claim 1 wherein a value in at least one parameter/value pair comprises a name of an environmental variable.

6. The method of claim 1 wherein a value in at least one parameter/value pair comprises a name of a second parameter.

7. The method of claim 6 wherein the first parameter is set to a value that comprises the name of the second parameter, the method further comprising:

setting a value of the second parameter to a value in a parameter/value pair in a selected section having the highest specified precedence of those selected sections that contain a parameter/value pair containing the second parameter; and substituting the value of the second parameter for the name of the second parameter in the value of the first parameter.

8. A computer-readable medium containing instructions for performing a method for setting a first parameter's value based on at least one initialization file, the at least one initialization file containing sections, at least one of the sections containing a parameter/value pair, the method comprising:

selecting sections of the at least one initialization file;

specifying an order of precedence among the selected sections of the at least one initialization file; and setting the first parameter's value to a value in a parameter/value pair in a selected section having the highest specified precedence of those selected sections that contain a parameter/value pair containing the first parameter.

9. A system for setting a first parameter's value, the system comprising:

at least one initialization file, the at least one initialization file containing sections, at least one of the sections containing a parameter/value pair;

a first rule selecting sections of the at least one initialization file;

a second rule specifying an order of precedence among the selected sections of the at least one initialization file; and a processing system that applies the second rule to sections selected by the first rule to set the first parameter's value to a value in a parameter/value pair in a selected section having the highest specified precedence of those selected sections that contain a parameter/value pair containing the first parameter.

10. The system of claim 9 wherein the first rule selects at least one section of the at least one initialization file based on a name of the at least one section.

11. The system of claim 9 wherein the second rule specifies the order of precedence of at least one selected section based on a name of the at least one selected section.

12. The system of claim 9 wherein the second rule specifies the order of precedence of at least one selected section based on a location in the at least one initialization file of the at least one selected section.

13. The system of claim 9 wherein a value in at least one parameter/value pair comprises a name of an environmental variable.

14. The system of claim 9 wherein a value in at least one parameter/value pair comprises a name of a second parameter.

15. A computer-readable medium containing instructions for implementing a system for setting a first parameter's value, the system comprising:

at least one initialization file, the at least one initialization file containing sections, at least one of the sections containing a parameter/value pair;

a first rule selecting sections of the at least one initialization file;

a second rule specifying an order of precedence among the selected sections of the at least one initialization file; and a processing system that applies the second rule to sections selected by the first rule to set the first parameter's value to a value in a parameter/value pair in a selected section having the highest specified precedence of those selected sections that contain a parameter/value pair containing the first parameter.

16. A method for producing a resultant initialization file from at least two input initialization files, the input initialization files each containing at least one section containing at least one parameter/value pair, the sections having names, the method comprising:

specifying an order of precedence of the at least two input initialization files;

copying an input initialization file of the at least two input initialization files into the resultant initialization file; and for each input initialization file of the at least two input initialization files other than the input initialization file copied to the resultant initialization file, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair in a corresponding section in an input initialization file with precedence higher than that of the input initialization file, copying the parameter/value pair into a corresponding section in the resultant initialization file and, if the parameter in the parameter/value pair corresponds to a parameter in another parameter/value pair in the corresponding section in the resultant initialization file, deleting the other parameter/value pair.

17. The method of claim 16 wherein the order of precedence is specified in accordance with each input initialization file's level in a hierarchy of belonging of a configurable entity.

18. The method of claim 17 wherein the configurable entity is in the set: computer operating system, application program.

19. The method of claim 17 wherein at least one level in the configurable entity's hierarchy of belonging is in the set: global, network domain, cluster, user, machine, application run.

20. The method of claim 16 wherein copying copies the input initialization file with the highest precedence of the input initialization files.

21. A computer-readable medium containing instructions for performing a method for producing a resultant initialization file from at least two input initialization files, the input initialization files each containing at least one section containing at least one parameter/value pair, the sections having names, the method comprising:

specifying an order of precedence of the at least two input initialization files;

copying an input initialization file of the at least two input initialization files into the resultant initialization file; and for each input initialization file of the at least two input initialization files other than the input initialization file copied to the resultant initialization file, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair in a corresponding section in an input initialization file with precedence higher than that of the input initialization file, copying the parameter/value pair into a corresponding section in the resultant initialization file and, if the parameter in the parameter/value pair corresponds to a parameter in another parameter/value pair in the corresponding section in the resultant initialization file, deleting the other parameter/value pair.

22. A method for producing a resultant initialization file from at least two input initialization files, the input initialization files each containing at least one section containing at least one parameter/value pair, the sections having names, the method comprising:

specifying an order of precedence of the at least two input initialization files;

copying an input initialization file of the at least two input initialization files into the resultant initialization file; and for each input initialization file of the at least two input initialization files other than the input initialization file copied to the resultant initialization file, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair copied into a corresponding section of the resultant initialization file from an input initialization file with precedence higher than that of the input initialization file, copying the parameter/value pair into the corresponding section in the resultant initialization file and, if the parameter in the parameter/value pair corresponds to a parameter in another parameter/value pair in the corresponding section in the resultant initialization file, deleting the other parameter/value pair.

23. The method of claim 22 wherein the order of precedence is specified in accordance with each input initialization file's level in a hierarchy of belonging of a configurable entity.

24. The method of claim 23 wherein the configurable entity is in the set: computer operating system, application program.

25. The method of claim 23 wherein at least one level in the configurable entity's hierarchy of belonging is in the set: global, network domain, cluster, user, machine, application run.

26. The method of claim 22 wherein copying copies the input initialization file with the highest precedence of the input initialization files.

27. A computer-readable medium containing instructions for performing a method for producing a resultant initialization file from at least two input initialization files, the input initialization files each containing at least one section containing at least one parameter/value pair, the sections having names, the method comprising:

specifying an order of precedence of the at least two input initialization files;

copying an input initialization file of the at least two input initialization files into the resultant initialization file; and for each input initialization file of the at least two input initialization files other than the input initialization file copied to the resultant initialization file, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair copied into a corresponding section of the resultant initialization file from an input initialization file with precedence higher than that of the input initialization file, copying the parameter/value pair into the corresponding section in the resultant initialization file and, if the parameter in the parameter/value pair corresponds to a parameter in another parameter/value pair in the corresponding section in the resultant initialization file, deleting the other parameter/value pair.

28. A method for producing a resultant initialization file from at least two input initialization files, the input initialization files each containing at least one section containing at least one parameter/value pair, the sections having names, the method comprising:

specifying an order of precedence of the at least two input initialization files; and for each input initialization file of the at least two input initialization files, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair in a corresponding section in an input initialization file with precedence higher than that of the input initialization file, copying the parameter/value pair into a corresponding section in the resultant initialization file.

29. The method of claim 28 wherein the order of precedence is specified in accordance with each input initialization file's level in a hierarchy of belonging of a configurable entity.

30. The method of claim 29 wherein the configurable entity is in the set: computer operating system, application program.

31. The method of claim 29 wherein at least one level in the configurable entity's hierarchy of belonging is in the set: global, network domain, cluster, user, machine, application run.

32. A computer-readable medium containing instructions for performing a method for producing a resultant initialization file from at least two input initialization files, the input initialization files each containing at least one section containing at least one parameter/value pair, the sections having names, the method comprising:

specifying an order of precedence of the at least two input initialization files; and for each input initialization file of the at least two input initialization files, for each section in the input initialization file whose name does not correspond to a name of a section in the resultant initialization file, creating a section in the resultant initialization file with a name corresponding to the name of the section; and for each parameter/value pair in a section in the input initialization file whose parameter does not correspond to a parameter in a parameter/value pair in a corresponding section in an input initialization file with precedence higher than that of the input initialization file, copying the parameter/value pair into a corresponding section in the resultant initialization file.

* * * * *